May 3, 1949. W. G. ROSS 2,469,131
INFLATABLE DOOR SEALING SYSTEM
Filed May 28, 1947
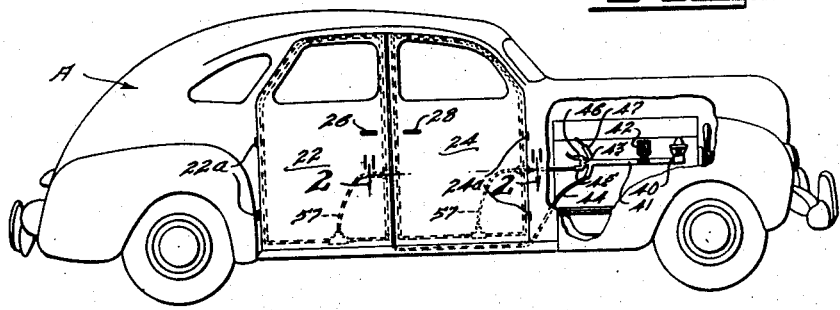
INVENTOR
Walter G. Ross
BY Harness and Harris
ATTORNEYS.

Patented May 3, 1949

2,469,131

UNITED STATES PATENT OFFICE 2,469,131

INFLATABLE DOOR SEALING SYSTEM

Walter G. Ross, Berkley, Mich., assignor to Chrysler Corporation, Highland Park, Mich., a corporation of Delaware Application May 28, 1947, Serial No. 751,155

15 Claims. (Cl. 296—44)

The present invention relates to methods of and apparatus for sealing a joint between a closure member and its supporting frame, such sealing means also constituting an anti-rattle device between the associated members. It will be appreciated from a complete understanding of the present invention that the sealing means herein disclosed may be practiced in widely different forms and for widely different purposes. By way of illustration, but not of limitation, this invention is specifically disclosed as applied to the doors of an automobile, but it is obvious that this invention may be applied to all forms of closure members, including refrigerator doors, water-tight hatches, turrets and the like.

It has long been the practice to provide rubber bumpers or stops for cooperation between an automobile door and its associated supporting frame structure, such stops being adapted to be somewhat compressed when the door is moved to the fully closed position so as to yieldingly hold the door and prevent it from rattling against the supporting frame structure. More recently it has become the practice to extend the compressible stop members completely around the edges of the door member so as to provide a sealing effect as well as an anti-rattle effect. The sealing effect is becoming of increasing importance due to the present tendency to provide automobiles with heaters and so-called air conditioning equipment. In an effort to provide a combination sealing and anti-rattle means, inflated tube members have been placed between the closure member and its supporting frame structure, but these inflated tube members have not proven satisfactory unless the tubes were capable of being deflated while the closure member was being moved to its fully closed position so as not to interfere with the closing of the member. While inflatable sealing systems for closure members of the type herein referred to are known to the art, such sealing systems have been complicated and expensive due to the equipment such as pumps, compressors, and special valve systems required, and also due to the large amount of labor required for the installation of such systems.

It is a primary object of the present invention to provide an improved method of, and apparatus for, sealing a joint between a closure member and its supporting framework, characterized by the fact that the sealing means is collapsed while the closure member is being moved to its fully closed position and then automatically inflated after reaching this position so as to form a substantially air tight seal, as well as an anti-rattle means, between the closure member and its supporting framework.

It is a further object of this invention to provide a sealing system in which the expansion and collapse of the sealing tube may also be controlled by the operation of the automobile engine.

A further object of this invention is to provide a combination sealing and anti-rattle system for a closure member which is of an inexpensive, simplified design, that uses a minimum of parts, and that may be easily and economically installed.

It is a further object of this invention to provide a combination sealing and anti-rattle system for a closure member that uses a unique, simplified control valve to automatically deflate the sealing tubes whenever the closure member is opened and that does not permit automatic inflation of the sealing tubes until after the closure member has been returned to its fully closed position.

With the above, as well as more detailed objects in view, which appear in the following description and in the appended claims, preferred, illustrative embodiments of the invention are shown in the accompanying drawings, throughout the several views of which corresponding reference characters have been used to designate corresponding parts and in which:

Fig. 1 is a side elevation of an automobile embodying this invention, parts being broken away to more clearly illustrate the invention;

Fig. 2 is a sectional elevational view taken along the line 2—2 of Fig. 1 clearly disclosing the valve system and inflated tube sealing means when the automobile door is in fully closed position;

Fig. 3 is a cross sectional view of one form of inflatable sealing tube proposed for use with this sealing system;

Fig. 4 is a cross sectional view of another form of inflatable sealing tube proposed for use with this type of sealing system; and Fig. 5 is a sectional elevational view of a second embodiment of this invention wherein the inflatable sealing tubes are mounted on the supporting frame instead of the closure member, such installation using a slightly different form of control valve.

Referring first to the system disclosed in Figs. 1 and 2, the illustrated vehicle A is provided with the usual doors 22 and 24, at one side thereof, which doors are hinged respectively at their rear and front edges 22a and 24a and are provided with the usual locking devices, represented by the handles 26 and 28, to retain them in their fully closed positions. In accordance with the present invention, the usual solid rubber sealing strips between the doors 22 and 24 and the associated frame members of the vehicle A have been eliminated and replaced by the inflatable tubular sealing members 30 and 32 (see Fig. 2). The tubular sealing member 30 is associated with the door 22, and the tubular sealing member 32 is associated with the door 24. It will be appreciated that the seals 30 and 32 are formed to extend completely around the associated door openings and that when the doors are fully closed and the sealing tubes inflated, to a pressure of approximately 8 pounds per square inch, the tubes are engaged and compressed so as to form substantially airtight, anti-rattling seals between the flanges 22b and 24b of the associated doors and the adjacent supporting frame members 36. The doors at the opposite side of the vehicle are, of course, similarly equipped.

Within the broader aspects of the present invention, the tubular seals 30 and 32 may be constructed in various ways. As specifically shown in Fig. 2 each seal is formed as a continuous tube having a thickened base portion 30a, provided with grooves or recesses 30b at the side thereof to increase the flexibility of the inflated tube portion which is formed by the relatively thin outer case portion 30c. The base portion 30a is adapted to be connected to a supporting member by any well-known means such as cementing, bending metal flange members against the base portion 30a, inserting stud projections from the base portion 30a into apertures in the supporting framework, or any other well-known means of attachment. Inflatable tube 32 is identical in construction to tube 30.

Fig. 3 shows a seal similar to the seal shown in Fig. 2, in that the relatively thin outer casing 30c forms the inflatable tube portion, recesses 30b are provided to increase the flexibility of the tube portion 30c and a base portion 30a in this instance is composed of a portion 30d formed of tough air impervious rubber, or the like, and is supported on a sponge rubber attaching portion 30e which lends itself to being cemented to a supporting framework and at the same time forms a shock absorbing and anti-rattling base for the inflatable sealing tube.

Fig. 4 shows another form of inflatable sealing tube denoted by the reference numeral 37, the inflatable casing member formed by the relatively thin casing 37c has diverging side members which form V-shaped recesses 37b to provide increased flexibility for the tubular member 37c. Tubular member 37c is supported on a base portion 37a comprising a tough rubber supporting portion 37d and a sponge rubber attaching portion 37e. The portion 37e constitutes a shock absorbing cushion for the inflatable tubular member and at the same time lends itself to cementing to the metal member on which the sealing tube is to be mounted.

In order to effect the expansion of the tubular seals 30 and 32 (Fig. 2), it is preferred to provide the vehicle A with a suitable source of compressed air, or its equivalent. This pressure fluid system is diagrammatically indicated in Fig. 1 as including a suitable vehicle engine driven air pump 40, such as a windshield wiper booster pump or a pump operated by manifold pressure, which will provide air or the like to the supply conduit 41 under a pressure of approximately 8 pounds per square inch. Located in supply conduit 41 is an adjustable relief valve 42 and a four-way Y-coupling 43 to which is connected branch lines 44, 45, 46 and 47, which are respectively directed to the several doors of the vehicle A. Relief valve 42 is set to open slightly above 8 pounds pressure so that excessive pressure will not build up in the sealing system when all doors are closed and a closed system exists. When the engine is running, air under suitable pressure will be supplied to the various doors of the vehicle by the branch lines heretofore indicated. Each branch line terminates at a pressure control valve V which consists of two complementary, compressible, hollow, cylindrical members 51 and 52 respectively. The two-piece pressure control valve resembles two grommets, one of which is fastened to a wall of a frame member defining the opening in the vehicle body and the other of which is mounted on the peripheral wall of the door adjacent the wall of the opening carrying the other part of the valve. Each grommet member 51 and 52, is substantially a hollow cylinder with a channel cut in its outer side wall to facilitate its attachment to the door or supporting frame member. The holes through these cylindrical sections are such that the branch pressure lines may be easily connected thereto so as to form airtight joints. The dimensions of the cylindrical sections 51 and 52, are such that the engaging faces or ends 53 and 54 are slightly compressed and forced against each other by a pressure of approximately 10 pounds per square inch when the door is fully closed. This gives an airtight seal between the two valve members 51 and 52 and completes the pressure line from the supply source 40 to the inflatable tube sealing means 32 or 30. These valve members 51 and 52 are formed in such a manner that the engaging faces 53 and 54 are at an angle of approximately 12° with the vertical when the parts 52 and 53 are pressed together. This eliminates any obstruction caused by the angle of swing of the door. A connecting line 57 leads from the valve part 52 to a connection 58 in the inflatable sealing tube 30 or 32 to complete the pressure system. It will be seen that when door 24 is open its valve V is automatically opened and pressure medium supplied by line 45 is now directed to the atmosphere and the seal means 32 will be automatically deflated and will remain so until after the door 24 is again completely closed. During closing operation the sealing means 32 remains deflated so as not to interfere in any way with the closing of the door. Upon fully closing the door 24, valve member 52 is pressed against valve member 51 so as to form an airtight seal between the contiguous, adjacent faces 53 and 54 of the valve unit V and once again the pressure medium from the pump 40 will be directed, via line 45, valve V and line 57, into the inflatable sealing tube 32 to re-establish a substantially airtight seal between the door 24 and the supporting frame member 36.

Considering the operation of the above described sealing system, it will be appreciated that when all the doors of the vehicle are closed, all of the control valves V associated therewith are correspondingly closed, due to the compressed condition of the valve members forming the airtight joints in the conduit lines. If any one of the doors is open, the corresponding pressure control valve V is opened and, as clearly appears from the parallel arrangement of the conduit branch lines, all of the sealing tubes associated with all of the doors of the vehicle will be deflated. The opened door, as well as any subsequently opened doors, may be readily reclosed since the deflated seals yield readily during the closing movement and do not appreciably interfere with the closing movement. The proportioning of the seals is such that even when collapsed they form a sufficient seal between the door and frame to minimize drafts and the entrance of dust or other foreign material.

Thus it will be seen that the two-piece pressure control valve V constitutes a simple, inexpensive inlet and outlet valve means for each of the closure members of the vehicle. Immediately on the opening of any door of the vehicle the pressure in the sealing system is automatically reduced and the tubular sealing means deflated so that the open door may be later easily closed after which the substantially airtight sealing system will be immediately re-established.

In Fig. 5 there is disclosed a similar sealing system in which the inflatable sealing tubes have been mounted on the supporting framework for the closure member instead of on the closure member itself. In this embodiment valve W comprises a two-piece unit, one member 61 being identical to the member 51 of valve V previously described. Valve member 62 which is mounted on the closure member, such as door 24, is merely a solid rubber block or plug member which opens and closes the passageway 64 through the member 61 of valve W. The engaging faces 65 and 66 of valve members 61 and 62 respectively are formed at such an angle that there is no obstruction to the swinging of door 24 to its fully closed position. This embodiment functions the same as the system using valve V, in that, on opening of the door 24 valve member 62 breaks the pressure supply line and the inflatable sealing tube 32 will be immediately deflated and remain so until after door 24 is returned to its fully closed position. Upon fully closing the door 24 valve member 62 closes off the passageway 64 through member 61 and re-establishes the closed pressure system to the inflatable sealing tube 32 whereupon the sealing tube 32 will be inflated and a substantially airtight, anti-rattling seal re-established.

Although specific forms, as well as specific adaptations, of the invention have been described in detail, it will be appreciated that these are purely illustrative and that the invention, both as to method and as to apparatus, may be embodied in widely different forms and applied to widely different uses within the spirit and scope of the appended claims.

I claim:

1. The combination with a hingedly mounted vehicle door and a supporting frame defining the door opening, of an expansible and collapsible sealing tube mounted on the door so as to extend around the joint between the door and the opening in the supporting frame, means providing a source of pressure fluid to inflate said sealing tube, and conduit means connecting said source of pressure fluid to said sealing tube comprising a complementary two-piece pressure control valve one valve piece being mounted on said door and the other valve piece being mounted on said frame, said valve pieces being arranged to automatically cause expansion of said sealing tube when said door is in a fully closed position and to automatically deflate said sealing tube when said door is opened.

2. The combination with a hingedly mounted vehicle door and a supporting frame defining the door opening, of an expansible and collapsible sealing tube mounted on the door so as to extend around the joint between the door and the opening in the supporting frame, means providing a source of pressure fluid to inflate said sealing tube, and conduit means connecting said source of pressure fluid to said sealing tube comprising a complementary two-piece pressure control valve operable to automatically inflate said sealing tube when said door is in a fully closed position and to automatically deflate said sealing tube when said door is opened, one piece of said valve being mounted on said door and the other complementary piece of said valve being mounted on the supporting frame, said parts being so constructed and arranged as to engage and complete the pressure conduit line from the source of pressure fluid to the sealing tube only when said door is fully closed.

3. The combination with a hingedly mounted vehicle door and a supporting frame defining the door opening, of an expansible and collapsible sealing tube mounted on the door so as to extend around the joint between the door and the opening in the supporting frame, means providing a source of pressure fluid to inflate said sealing tube, and conduit means connecting said source of pressure fluid to said sealing tube comprising a complementary two-piece pressure control valve operable to automatically inflate said sealing tube when said door is in a fully closed position and to automatically deflate said sealing tube when said door is opened, said control valve comprising a first grommet-shaped, compressible member mounted on the supporting frame and a second grommet-shaped, compressible member mounted on the door so as to engage the first member and form an airtight joint in the pressure conduit line when said door is in its fully closed position.

4. The combination with a hingedly mounted vehicle door and a supporting frame defining the door opening, of an expansible and collapsible sealing tube mounted on the door so as to extend around the joint between the door and the opening in the supporting frame, means providing a source of pressure fluid to inflate said sealing tube, and conduit means connecting said source of pressure fluid to said sealing tube comprising a complementary two-piece pressure control valve operable to automatically inflate said sealing tube when said door is in a fully closed position and to automatically deflate said sealing tube when said door is opened, said control valve comprising a first grommet-shaped, compressible member mounted on the supporting frame and a second grommet-shaped, compressible member mounted on the door so as to engage the first member and form an airtight joint in the pressure conduit line when said door is in its fully closed position, the engaging faces of said grommet-shaped valve members being formed so as not to obstruct the swinging of said door to its fully closed position.

5. The combination with a hingedly mounted door member and a supporting frame member defining the door opening, of an expansible and collapsible sealing tube mounted on one of said members so as to extend around the joint between the door and the opening in the supporting frame, means providing a source of pressure fluid to inflate said sealing tube, and conduit means connecting said source of pressure fluid to said sealing tube comprising engageable conduit sections mounted on said members forming a two-piece pressure control valve operable to automatically inflate said sealing tube when said door is in a fully closed position and to automatically deflate said sealing tube when said door is opened.

6. The combination with a hingedly mounted closure member and a supporting frame defining an opening, said closure member being provided with a means to lock it in a fully closed position, of an expansible and collapsible sealing tube mounted on the closure member so as to extend completely around the joint between the closure member and the opening in the supporting frame, means providing a source of pressure fluid to inflate said sealing tube, and conduit means connecting said source of pressure fluid with said sealing tube comprising a relief valve and a two-piece pressure control valve, said control valve comprising a first grommet-shaped member mounted on said supporting frame and a second grommet-shaped member mounted on the closure member adapted to engage said first grommet-shaped member so as to form an airtight joint in said conduit means when said closure member is moved to a fully closed position, at least one of said grommet-shaped members being formed of compressible material.

7. The combination with a closure member and a supporting frame defining an opening, said closure member being provided with a means to lock it in a fully closed position, of an expansible and collapsible sealing tube mounted on the closure member so as to extend completely around the joint between the closure member and the opening in the supporting frame, means providing a source of pressure fluid to inflate said sealing tube, and conduit means connecting said source of pressure fluid with said sealing tube comprising a relief valve and a two-piece pressure control valve, said control valve comprising a first grommet-shaped member mounted on said supporting frame and a second grommet-shaped member mounted on the closure member adapted to engage said first grommet-shaped member so as to form an airtight joint in said conduit means when said closure member is moved to a fully closed position, at least one of said grommet-shaped members being formed of compressible material.

8. The combination with a supporting frame member defining an opening and a closure member for said opening hingedly mounted on said frame member, of an expansible and collapsible sealing tube mounted on one of said members so as to extend completely around the joint between said members, means providing a source of pressure fluid to inflate said sealing tube, and conduit means connecting said source of pressure fluid with said sealing tube comprising a relief valve and a two-member pressure control valve, said control valve comprising a first grommet-shaped valve member mounted on said supporting frame and a second complementary valve member mounted on said closure member adapted to engage said first valve member when said closure member is in fully closed position so as to form an airtight joint in said conduit means, at least one of said valve members being formed of compressible material.

9. The combination with a supporting frame member defining an opening and a closure member for said opening hingedly mounted on said frame member, of an expansible and collapsible sealing tube mounted on said frame member so as to extend completely around the joint between said frame member and said closure member, means providing a source of pressure fluid to inflate said sealing tube, and conduit means connecting said source of pressure fluid with said sealing tube comprising a relief valve and a two-member pressure control valve, said control valve comprising a first grommet-shaped valve member mounted on said frame member and a second plug member mounted on said closure member adapted to engage said first valve member when said closure member is moved to fully closed position and to form an airtight joint in said conduit means.

10. The combination with a supporting frame member defining an opening and a closure member for said opening hingedly mounted on said frame member, of an expansible and collapsible sealing tube mounted on said frame member so as to extend completely around the joint between said frame member and said closure member, means providing a source of pressure fluid to inflate said sealing tube, and conduit means connecting said source of pressure fluid with said sealing tube comprising a relief valve and a two-member pressure control valve, said control valve comprising a first grommet-shaped valve member mounted on said frame member and a second plug member mounted on said closure member adapted to engage said first valve member when said closure member is moved to fully closed position and to form an airtight joint in said conduit means, at least one of said valve members being formed of compressible material.

11. The combination with a supporting frame member defining an opening and a closure member for said opening hingedly mounted on said frame member, said members having a means to lock the closure member in a fully closed position, of an expansible and collapsible sealing tube mounted on said frame member so as to extend completely around the joint between said frame member and said closure member, means providing a source of pressure fluid to inflate said sealing tube, and conduit means connecting said source of pressure fluid with said sealing tube comprising a relief valve and a two-member pressure control valve, said control valve comprising a first grommet-shaped valve member mounted on said frame member and a second plug member mounted on said closure member adapted to engage said first valve member when said closure member is moved to fully closed position and to form an airtight joint in said conduit means.

12. In a motor vehicle body having a door opening therein defined by a bounding wall, a swingably mounted door for said opening having a bounding peripheral wall adapted to register with the wall bounding said opening, an inflatable sealing tube carried by one of said walls and engageable with the other thereof for establishing a seal therebetween, a source of inflating medium for said tube, and a conduit connecting said sealing tube with said source of inflating medium, said conduit including a two-piece pressure control valve comprising a stationary hollow member mounted on the bounding wall of said door opening and a second complementary valve member mounted on and swingable with said door and arranged so as to be disposed adjacent to an open end of said stationary hollow valve member when said door is closed, said second valve member constituting a means for controlling the pressure of the inflating medium in the sealing tube so as to automatically control inflation and deflation of said sealing tube.

13. In a motor vehicle body having a door opening therein defined by a bounding wall, a swingably mounted door for said opening having a bounding peripheral wall adapted to register with the wall bounding said opening, latch means to lock said door in a fully closed position, an inflatable sealing tube carried by one of said walls and engageable with the other thereof for establishing a seal therebetween, a source of inflating medium for said tube, and a conduit connecting said sealing tube with said source of inflating medium, said conduit including a relief valve and a two-piece pressure control valve comprising a stationary hollow member mounted on the bounding wall of said door opening and a second complementary valve member mounted on and swingable with said door and arranged so as to be disposed adjacent to an open end of said stationary hollow valve member when said door is closed, said second valve member constituting a means for controlling the pressure of the inflating medium in the sealing tube so as to automatically control inflation and deflation of said sealing tube.

14. The combination with a closure member and an associated member defining a closure opening, of an expansible and collapsible sealing element mounted on one of said members so as to extend along the joint between said members when said closure member closes said opening, means providing a source of pressure fluid for expanding said sealing element, and conduit means connecting said source to said sealing element comprising engageable, cooperating valve pieces mounted on each of said members and arranged to automatically control expansion of said sealing element in accordance with the position of said closure member relative to said opening.

15. The combination with a closure member and an associated member defining a closure opening, of an expansible and collapsible sealing element adapted to be positioned along the joint between said members when said closure member has been moved to closed position, means providing a source of pressure fluid for expanding said sealing element, and conduit means connecting said pressure fluid source with said sealing element comprising engageable, cooperating valve pieces mounted on each of said members and arranged to automatically control expansion of said sealing element in accordance with the position of said closure member relative to said opening.

WALTER G. ROSS.

REFERENCES CITED

The following references are of record in the file of this patent:

UNITED STATES PATENTS

| Number | Name | Date |
|---|---|---|
| 2,301,963 | Marple et al. | Nov. 17, 1942 |